United States Patent [19]

Sundahl

[11] 3,908,278
[45] Sept. 30, 1975

[54] CALIBRATION BLOCK
[75] Inventor: Edwin G. Sundahl, Downers Grove, Ill.
[73] Assignee: The United States of America as represented by the United States Energy Research and Development Administration, Washington, D.C.
[22] Filed: Mar. 21, 1974
[21] Appl. No.: 453,604

[52] U.S. Cl. ............................ 33/168 R; 33/174 H
[51] Int. Cl.² .......................................... G01B 3/30
[58] Field of Search ......... 73/1 R; 33/174 H, 143 H, 33/168

[56] References Cited
UNITED STATES PATENTS
| | | | |
|---|---|---|---|
| 2,536,401 | 1/1951 | Victor | 33/168 R |
| 2,664,638 | 1/1954 | Storey | 33/168 R |
| 3,201,873 | 8/1965 | Bell et al. | 33/168 R |
| 3,417,475 | 12/1968 | Viasaty | 33/168 R |

FOREIGN PATENTS OR APPLICATIONS
1,156,525    12/1959    France .......................... 33/168 R Primary Examiner—S. Clement Swisher
Attorney, Agent, or Firm—Dean E. Carlson; Arthur A. Churm; Hugh W. Glenn

[57] ABSTRACT

A hardened metal block is precisely machined, ground and lapped so as to include a number of stepped surfaces that are accurately dimensioned from a base surface. The base surface is of precision flatness in order to be wrung into adhesive contact with a companion block of precision measurements. A portion of the calibration block is removed to provide access to the companion block as a reference point.

3 Claims, 6 Drawing Figures

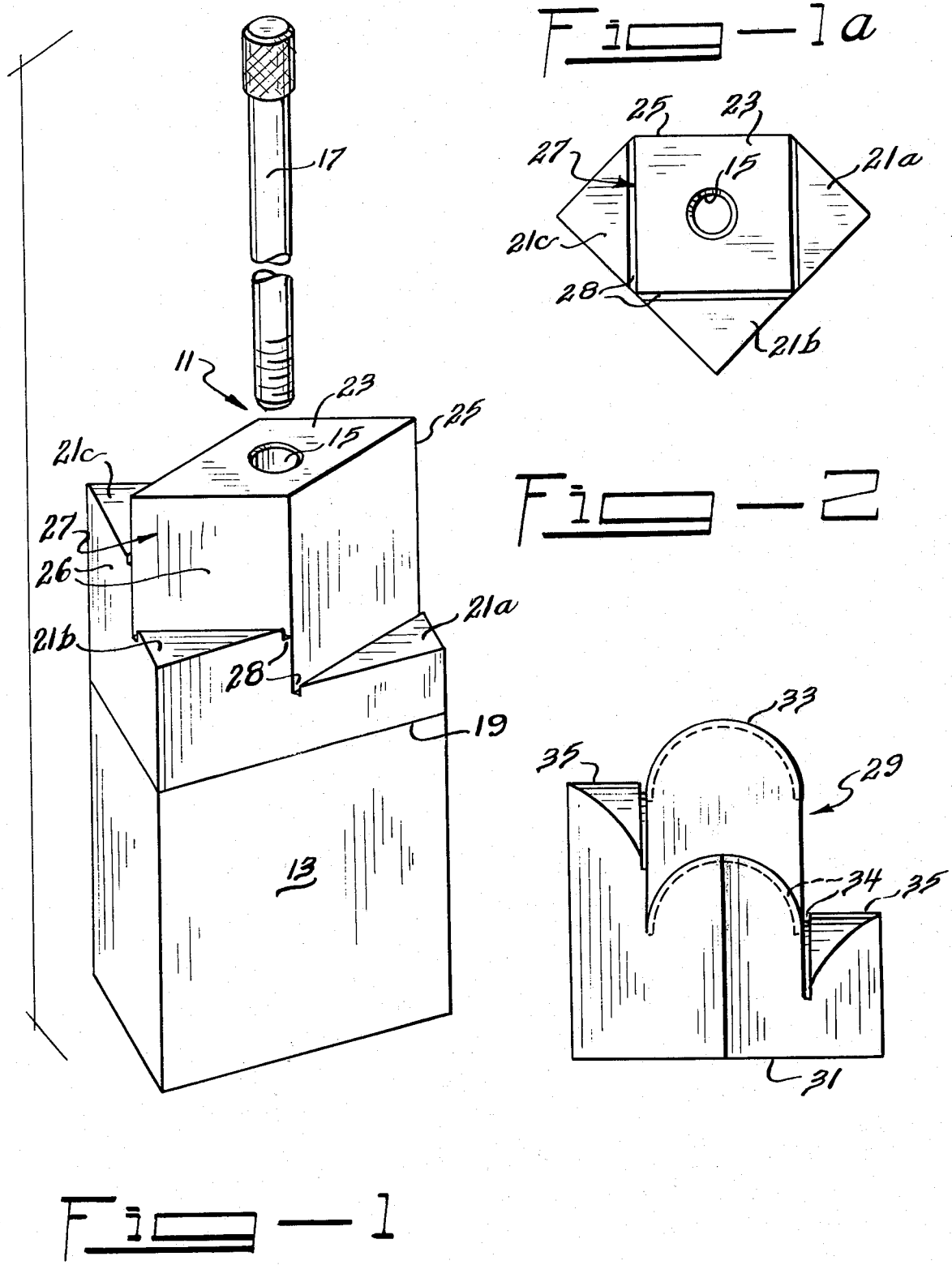

Fig-3
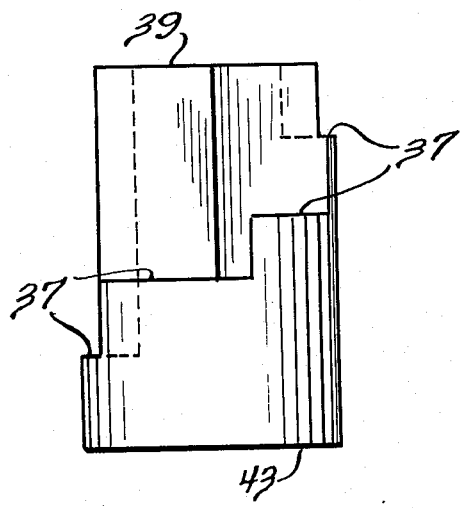
Fig-3a
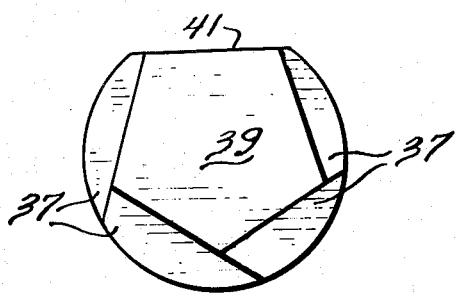
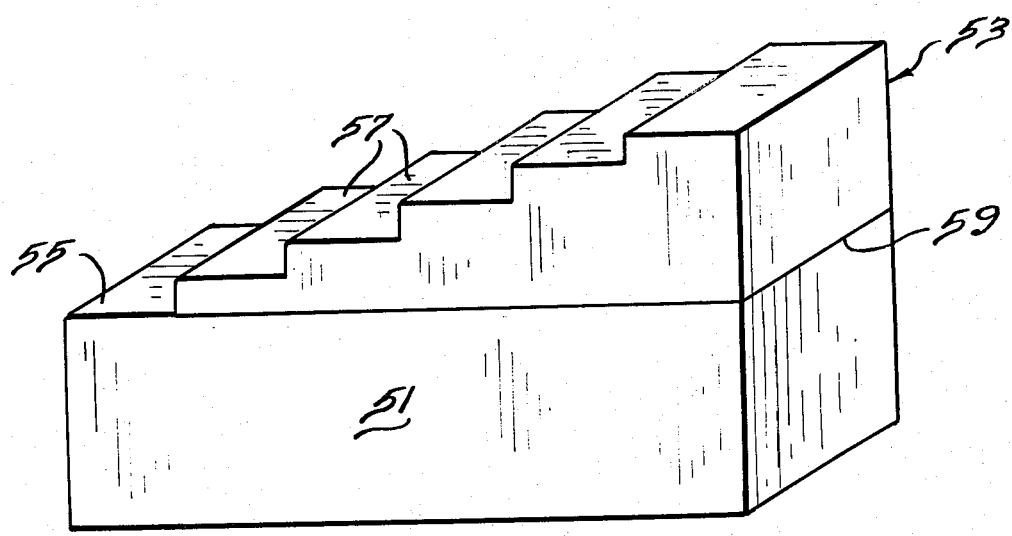
Fig-4

CALIBRATION BLOCK

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention relates to calibration blocks, often called Johansson or gauge blocks, for precision measurements in the calibration of a machinist's measurement tools. Such blocks are particularly applicable in the calibration of micrometers, calipers and verniers.

Conventional calibration blocks are ordinarily provided in the shape of a cube, a disk or a rectilinear prism. At least two surfaces of the block, such as the end surfaces of a disk or prism, will be heat treated, ground and lapped to a high degree of flatness, that is to gauge block tolerances. Gauge block tolerances as used herein contemplate the range of tolerances ordinarily encountered within the art. Generally a gauge block is made to a precision of a few millionths of its overall measure. Tolerance grades for gauge blocks are given in Federal Specification GGG-G-15B, Nov. 6, 1970, available from the General Services Administration or the Superintendent of Documents, U.S. Government Printing Office, Washington, D.C.

Individual blocks are fabricated with precise dimensions to such tolerances between two flat surfaces. A set of blocks, for example, may include precisely dimensioned blocks of one, two or more inches and of various increments of an inch. Of course, similar blocks to metric scale measures are also available. The blocks are used alone or in stacks to make up the precise dimension to be measured. In stacking the blocks, they are wrung together on their flat surfaces to exclude gaps that would produce inaccurate dimensions.

In calibrating measurement tools and instruments such as a micrometer or a vernier, it is often necessary to compare the reading of the instrument with a precise measure at various points along its scale. A bow at the remote end of a vernier would not be detectable with close scale calibrations. For each calibration it is required to assemble a different combination of blocks as a standard measure. An opportunity for dimensional error is presented each time the blocks are assembled.

Precision calibration blocks are themselves calibrated in respect to a standard gauge block traceable to the United States National Bureau of Standards. Each time the blocks are employed, the risk of dropping, touching, scratching or otherwise damaging the precisely machined surfaces arises. Consequently, the repetitive coupling and uncoupling of a variety of gauge blocks while calibrating precision instruments produces an increased likelihood of damage to the blocks.

SUMMARY OF THE INVENTION

Therefore, in view of the limitations of the prior art, it is an object of the present invention to provide an improved calibration block for use in making a sequence of different measurements.

It is also an object to provide a calibration block that may be used for multiple measurements with minimal handling and recombination with other blocks.

It is a further object to provide a calibration block that presents convenient dimensions for the calibration of a machinist's micrometer or vernier.

In accordance with the present invention a calibration block is provided that includes a base surface and a plurality of stepped surfaces progressing upwardly from the base surface to an uppermost surface. Each stepped surface including the uppermost surface is precisely spaced from the base surface by a known measure. The distance between the base surface and each stepped surface are made readily accessible to the instrument which is to be calibrated.

BRIEF DESCRIPTION OF THE DRAWINGS

The present invention is illustrated in the accompanying drawings wherein:

FIG. 1 is a perspective view of a calibration block embodying the present invention in combination with a conventional gauge block.

FIG. 1a is a top view of the calibration block shown in FIG. 1.

FIG. 2 is an elevation view of a calibration block similar to that shown in FIG. 1 with modified step surfaces.

FIG. 3 is an elevation view of an alternate calibration block embodiment.

FIG. 3a is a top view of the calibration block shown in FIG. 3.

FIG. 4 is a perspective view of another form of calibration block.

DESCRIPTION OF THE PREFERRED EMBODIMENT

In FIG. 1 a calibration block 11 that illustrates one embodiment of the present invention is supported on a conventional gauge block 13. Both the calibration block and the gauge block include axially aligned openings shown at 15 for receiving an attachment pin 17. The attachment pin 17 includes an enlarged head at one end and a threaded portion at the other for receiving a nut (not shown) and securely fastening the two blocks together. In some applications a number of blocks are wrung together to form a stack and secured with an attachment pin.

Calibration block 11 is shown with a base surface 19 in intimate metal-to-metal contact with the top surface of gauge block 13. The base surface 19 of the calibration block along with the matching surface of gauge block 13 are fabricated to gauge block tolerances for flatness. For instance, each of these matching surfaces may be formed to a precision of flatness on the order of two to four millionths of the overall length of the gauge or calibration block. In view of these tolerances, gauge blocks are fabricated of materials selected to minimize dimensional changes resulting from variations in temperature.

Calibration block 11, as shown in FIGS. 1 and 1a, includes a plurality of stepped surfaces indicated as 21a, 21b, 21c and the uppermost stepped surface 23. Each of these stepped surfaces, as shown, are formed precisely parallel to base surface 19 and include a relief groove 28 adjacent to the vertical surface of the block. For use in the calibration of micrometers or other precision measurement tools, the stepped surfaces are equally spaced, that is in equal progression, in an upwardly spiral-like sequence around the block as shown, over the distance between base surface 19 and the uppermost surface 23. For instance, in a calibration using english units, a one inch cubic block can be provided with steps from the base surface of 0.250 inch, 0.500 inch, 0.750 inch and 1.000 inch to the uppermost surface. The measurements provided between each of these steps are to within the desired gauge block tolerances.

A calibration block of this type can be fabricated beginning with a precisely machined, metal cube. Corner segments of the cube are milled away from the uppermost surface 23 down to each of the stepped surfaces 21a, 21b and 21c leaving peripheral, columnar segments of block from the stepped surface to the base surface as shown. One corner segment is milled away throughout the height of the cube. This forms a vertical surface 25 and provides a zero or reference point at the exposed surface of the subjacent gauge block. Each of the corner segments are milled away to at least one-half of the diagonal length of each quadrant of the calibration block. This allows the four cuts to meet or overlap and provides a four-sided configuration at uppermost surface 23. If the calibration block is originally of sufficient size, additional corner segments may be milled away from the uppermost portion 27 of block 11 between stepped surface 21c and uppermost surface 23. However, additional stepped surfaces within this uppermost portion will be of smaller size than the stepped surfaces shown in the drawing.

After the steps have been machined within the block, the surfaces are hardened by conventional metallurgical techniques including heating and quenching procedures. The hardened surfaces are ground on an abrasive medium to approximately the final dimensions and then lapped with a mating form to within the required gauge block tolerances. The relief grooves 28 make it unnecessary to finish the step surfaces in the difficult to reach areas near the vertical portion of the block.

Turning now to FIG. 2 where a slightly modified calibration block 29 is shown. Calibration block 29 includes a precisely ground and lapped base surface 31, a plurality of stepped surfaces 35, and an uppermost stepped surface 33. As in the FIG. 1 embodiment base surface 31 is lapped to a high precision of flatness. However, each of the stepped surfaces 35 and the uppermost surface 33 are formed with precision, arcuate crowns as shown. These crowned, stepped surfaces are formed as portions of a cylindrical surface, that is, they are defined by the rotation of a straight line about an axis. Such arcuate surfaces are milled into the gauge block structure, heat treated to impart hardness and ground and lapped such that the crest on the crown is to the required tolerance. Relief grooves 34 cut adjacent to the vertical surfaces facilitate finishing the crowned surfaces.

In employing block 29 in the calibration of a micrometer, one index of the micrometer is disposed against base surface 31 or a parallel base surface of a subjacent gauge block and the opposing index is adjusted in respect to a select crown surface. The opposing index is passed over the crown surface while it is adjusted until it touches the highest crest on the crown. At this touch point, the micrometer can be read for calibration with errors minimized that might otherwise result ffrom touching the index to a flat stepped surface at an angle.

In the event that calibration block 29 is to be used in combination with conventional gauge blocks, a threaded, axial opening (not shown) can be provided in base surface 31. An attachment pin, as illustrated in FIG. 1, can be passed through the central openings of the conventional gauge blocks and threaded into this opening in base surface 31. A stack of blocks can thereby be secured together in this manner without breaching crowned surface 33.

FIGS. 3 and 3a illustrate a cylindrical calibration block with cylindrical segments removed to provide a plurality of stepped surfaces 37 in an upwardly spiral-like sequence around the block as shown. An uppermost surface 39 is shown as the top step of five stepped surfaces that progress upwardly around the perimeter of the cylinder. One complete cylindrical segment is shown removed from side 41 to give a reference point to a subjacent surface which is not shown. Four indented stepped surfaces 37 are provided by removing segments only part way down the length of the calibration block from the uppermost surface leaving peripheral, columnar segments of the block from the stepped surface to the base surface as shown. The fifth step from the base surface 43 is to the uppermost surface 39. It will be clear that any number of steps can be cut around the perimeter of a cylindrical block and that the depth of each step may be increased at the expense of the uppermost surface 39.

FIG. 4 shows two elongated blocks with rectilinear surfaces stacked one on the other. The lower block 51 is in the shape of a rectilinear prism. The upper block 53 is of shorter length than lower block 51 such that a portion of the upper surface of block 51 extends from beneath block 53 to form a reference or zero surface 55. Upper block 53 is generally in the shape of a rectilinear prism with lateral stepped surfaces 57 machined into the upper portion of this block. Stepped surfaces 57 and the base surface 59 of block 53 are made precisely parallel and to precision tolerances. As an alternative, the stepped surfaces can be provided with arcuate crowns as shown in FIG. 2 in both the FIGS. 3 and 4 embodiments.

Elongated blocks as thus illustrated at 51 and 53 can be employed to provide accurate measurements of, for instance, 1 centimeter from the base surface of block 51 to reference surface 55. Through the combination of the calibration block 53 with block 51 additional incremental measurements of say 1.2 cm, 1.4 cm, 1.6 cm, 1.8 cm and 2 cm with high precision can be provided by moving upwardly along stepped surfaces 57.

It can be seen that the present invention provides an improved calibration block with a plurality of stepped surfaces for calibrating precision tools at a number of increments. Use of such a block eliminates the tedious and time consuming task of assembling various combinations of conventional gauge blocks. Consequently, with reduced handling, the risk of damage to expensive and precision gauge blocks is minimized. Since the presently described calibration block can be fabricated with any desired distances between its base and stepped surfaces, it is adaptable to calibrations in metric, english or other unit systems. It can also be employed to set up dimensions that are frequently required in an assembly line in other manufacturing operations. Use of the present block for any of these purposes will eliminate the need for repetitive assemblage of various dimensions of conventional gauge blocks.

The embodiments of the invention in which an exclusive property or privilege is claimed are defined as follows:

1. In an integral calibration block having a base surface, a plurality of stepped measuring surfaces and an uppermost measuring surface, said block having a longitudinal axis passing through said base and uppermost surfaces, said measuring surfaces facing opposite to said base surface and defining measuring values comprising the spacing between said base and each of said measuring surfaces, the improvement wherein each of said stepped surfaces having one recessed groove across the innermost margin thereof and being atop one of a plurality of peripheral, columnar segments of progressively increasing height in an upwardly spiral-like sequence about said longitudinal axis of said block from said base surface to said uppermost surface, said uppermost surface being completely bounded by the upper edges of flat vertical surfaces, one of said vertical surfaces extending downwardly from said uppermost surface to one edge of said base surface and each of the remaining of said vertical surfaces extending downwardly from said uppermost surface to form one side of said recessed groove in the innermost margin of one of said stepped surfaces and each of said stepped surfaces being bounded along only one edge by an upwardly extending vertical surface at said recessed grooves.

2. The improvement of claim 1 wherein each of said stepped surfaces and said uppermost surface comprising an arcuate crown opposite to said base surface.

3. The improvement of claim 1 wherein said uppermost surface being defined by the uppermost edge of four vertical surfaces, each being contiguous at perpendicular angles to other of said vertical surfaces, one of said vertical surfaces extending from said uppermost to said base surface and each of the three remaining vertical surfaces extending downwardly to form one side of a recessed groove in the innermost edge of one of three stepped surfaces, each of said stepped surfaces being of flat triangular shape and being parallel to said base surface.

* * * * *